(12) United States Patent
Devaraj et al.

(10) Patent No.: US 12,291,781 B2
(45) Date of Patent: May 6, 2025

(54) HARDWARE AND MANUFACTURING METHODS TO COAT ELECTRODE MATERIALS TO SUBSTRATES IN SECONDARY IONIC BATTERY MANUFACTURING PROCESS

(71) Applicant: Pixion Batteries, Inc., Austin, TX (US)

(72) Inventors: Vikram Devaraj, Austin, TX (US); Varun Devaraj, Chennai (IN)

(73) Assignee: PIXION BATTERIES, INC., Austin, TX (US)

( * ) Notice: Subject to any disclaimer, the term of this patent is extended or adjusted under 35 U.S.C. 154(b) by 0 days.

(21) Appl. No.: 18/623,880

(22) Filed: Apr. 1, 2024

(65) Prior Publication Data

US 2024/0327990 A1    Oct. 3, 2024

Related U.S. Application Data

(60) Provisional application No. 63/456,465, filed on Apr. 1, 2023.

(51) Int. Cl.
*C23C 24/08* (2006.01)
*H01M 4/04* (2006.01)
(Continued)

(52) U.S. Cl.
CPC ......... *C23C 24/082* (2013.01); *H01M 4/0404* (2013.01); *H01M 4/0409* (2013.01); *H01M 4/0435* (2013.01); *B05D 1/12* (2013.01); *B05D 1/40* (2013.01); *B05D 2401/32* (2013.01); *C23C 24/00* (2013.01); *H01M 4/043* (2013.01); *H01M 4/886* (2013.01); *H01M 4/8896* (2013.01)

(58) Field of Classification Search
CPC .... C23C 24/00; C23C 24/082; H01M 4/0404; H01M 4/0409; H01M 4/043; H01M 4/0435; H01M 4/886; H01M 4/8896; B05D 1/12; B05D 1/40; B05D 2401/32
USPC ...................... 427/58, 180, 359, 369, 428.08
See application file for complete search history.

(56) References Cited

U.S. PATENT DOCUMENTS

3,519,512 A * 7/1970 Downs .................... B44C 3/082
                                                    8/467
5,114,744 A * 5/1992 Cloutier ................. H05K 3/102
                                                    427/191
(Continued)

*Primary Examiner* — Brian K Talbot (57) ABSTRACT

A counter-rotating roller system for coating electrode materials includes a roll-to-roll apparatus including a dispensing roller that selectively dispenses a conductive substrate from a substrate roll along a first direction towards a receiving roller. A counter-rotating roller module including a counter-rotating roller is stationarily positioned at a predetermined height over the conductive substrate. The direction of the tangential velocity of the counter-rotating roller at an interface between the counter-rotating roller and the conductive substrate is 180 degrees opposite the first direction of travel of the conductive substrate. The system further includes a continuous powder application module positioned on a feed side of the counter-rotating roller to continuously deposit a volume of a dry powder mixture on the conductive substrate prior to contact with the counter-rotating roller. A contact roller scraper contacting the counter-rotating roller removes powder particles from an outer surface of the counter-rotating roller.

6 Claims, 4 Drawing Sheets

(51) Int. Cl.
  *B05D 1/12*   (2006.01)
  *B05D 1/40*   (2006.01)
  *C23C 24/00*  (2006.01)
  *H01M 4/88*   (2006.01)

(56) References Cited

U.S. PATENT DOCUMENTS

| | | | | |
|---|---|---|---|---|
| 9,352,351 | B2* | 5/2016 | Sirviö | H05K 3/1283 |
| 10,084,179 | B2* | 9/2018 | Tanihara | H01M 4/0435 |
| 10,276,855 | B2* | 4/2019 | Uchida | H01M 4/0435 |
| 10,854,872 | B2* | 12/2020 | Komura | H01M 10/0525 |
| 10,887,998 | B2* | 1/2021 | Maijala | H05K 3/102 |
| 2003/0217806 | A1* | 11/2003 | Tait | B23K 26/38 |
| | | | | 156/254 |
| 2005/0123777 | A1* | 6/2005 | Maijala | B05B 5/14 |
| | | | | 427/458 |
| 2011/0008081 | A1* | 1/2011 | Aoyama | G03G 15/2096 |
| | | | | 399/327 |
| 2016/0181651 | A1* | 6/2016 | Tanihara | H01M 4/0435 |
| | | | | 118/103 |
| 2017/0352874 | A1* | 12/2017 | Hosono | H01M 4/0469 |
| 2018/0006293 | A1* | 1/2018 | Demaray | H01M 10/052 |
| 2020/0009603 | A1* | 1/2020 | Kosemura | B05C 11/04 |
| 2024/0204262 | A1* | 6/2024 | Sun | H01M 10/4235 |
| 2024/0208138 | A1* | 6/2024 | Shi | B29C 64/264 |
| 2024/0222594 | A1* | 7/2024 | Aliahmad | H01M 4/0435 |
| 2024/0258493 | A1* | 8/2024 | Suzuki | H01M 4/0471 |

* cited by examiner

HARDWARE AND MANUFACTURING METHODS TO COAT ELECTRODE MATERIALS TO SUBSTRATES IN SECONDARY IONIC BATTERY MANUFACTURING PROCESS

CROSS REFERENCE TO RELATED APPLICATIONS

This application claims priority to U.S. Provisional Patent Application No. 63/456,465 entitled HARDWARE AND MANUFACTURING METHODS TO COAT ELECTRODE MATERIALS TO SUBSTRATES IN SECONDARY IONIC BATTERY MANUFACTURING PROCESS filed Apr. 1, 2023 which is incorporated herein by reference in its entirety.

BACKGROUND

Innovation of portable electronic devices has drawn attention towards efficient energy storage as transportable systems and portable devices such as smartphones, laptops, and smart health devices, have reduced in size while their energy needs have increased. Electrochemical storage and conversion devices are expanding the capabilities of these systems in a variety of fields including portable electronic devices, air and space craft technologies, passenger and cargo vehicles, and biomedical instrumentation. Electrochemical storage and conversion devices have designs and performance attributes specifically engineered to provide compatibility with a diverse range of application requirements and operating environments.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Significant pressures exist to expand the functionality of energy storage and conversion devices, such as batteries, fuel cells, and electrochemical capacitors, in an ever-widening range of applications. Continued development has created a need for mechanically robust, high reliability, and high energy density electrochemical storage and conversion devices capable of good performance in a useful range of operating environments. Many recent advances in electrochemical storage technology are attributable to fabrication and integration of new materials for device components. Battery technology, for example, continues to rapidly develop, at least in part, due to the development of electrode and electrolyte materials for these systems.

A secondary ionic battery has multiple components of which the cathode and the anode, collectively referred to as electrodes, are the most important and expensive parts of the battery to manufacture. Conventionally, many lithium-ion battery electrodes are manufactured using a slurry coating process. In the slurry coating process, the electrode precursor materials are dispersed in a solvent to create an electrode slurry. The main component of the solids mixture in an electrode slurry is the active electrode material in powder form. The mixture may also include lesser amounts of electrically conductive additive material and polymeric binder, both also in powder form, with the active electrode material making up the majority fraction of the solids mixture.

The electrode slurry is coated onto metal current collectors before undergoing a long, slow, and energy intensive drying process to remove the solvent and create a film on the metal current collector. The solvent removal/drying process is critical as coating- or drying-related defects in the anode or cathode are known to occur at this stage. This powder-to-slurry-to-film production method yields a dry electrode film attached or bonded to a metal current collector. The final state of the electrode is a dried film or layer of electrode materials on a metal current collector. The solvent in the powder-to-slurry-to-film production method serves as a working medium for: (i) proper mixing, homogenous distribution, and easy spreading of the powder ingredients in slurry form; and (ii) binding of the solid mixture ingredients to the electrode current collector substrate. The complete removal of the solvent is required before an electrode can be used.

From an environmental standpoint, the slurry process is detrimental as it often involves harmful solvents, such as N-methyl-pyrrolidone (NMP). In processes involving NMP, a solvent recycling facility is further required in addition to drying equipment to prevent NMP from being released into the environment. This requirement to recover the solvent and prevent its release results in additional capital and operating costs when using a slurry electrode fabrication process involving NMP or other similar solvents. Accordingly, there is a need for electrode fabrication processes that avoids slurries and does not involve solvents. A solventless current collector coating process would be more energy- and cost-efficient by eliminating the energy intensive drying step needed to completely remove all the mediator solvent species.

Solventless electrode coating fabrication processes can promote a greener supply chain for energy storage devices such as lithium-ion batteries. Drying equipment occupies a large footprint; however, drying equipment would not be required in a solventless electrode fabrication process. Consequently, a solventless process requires a much smaller industrial footprint. This means not only is the solventless process efficient in terms of operating cost but would also be easier to deploy at the industrial scale for new battery manufacturers or existing manufacturers seeking to increase production.

To address these problems and improve electrode manufacturing, FIGS. 1-6 describe hardware and methods of coating electrode materials to substrates in a solventless manner by decoupling the electrode material mixing process from the binding processes that bind the solid mixture ingredients to the electrode current collector substrate. In some embodiments, a counter-rotating roller system for coating electrode materials includes a roll-to-roll apparatus including a dispensing roller that selectively dispenses a conductive substrate from a substrate roll. The conductive substrate is directed along a first direction towards a receiving roller. Further, a counter-rotating roller module including a counter-rotating roller is stationarily positioned at a predetermined height over the conductive substrate. The direction of the tangential velocity of the counter-rotating roller at an interface between the counter-rotating roller and the conductive substrate is 180 degrees opposite the first direction of travel of the conductive substrate. The counter-rotating roller system further includes a continuous powder application module positioned on a feed side of the counter-rotating roller module to continuously deposit a volume of a dry powder mixture on the conductive substrate prior to contact with the counter-rotating roller. A contact roller scraper contacting the counter-rotating roller is configured to remove residual powder particles from an outer surface of the counter-rotating roller.

With reference to FIGS. 1-5, a counter-rotating roller system according to a first embodiment is shown therein and designated 100. The counter-rotating roller system 100 includes a roll-to-roll apparatus 102 including a dispensing roller 104 that selectively dispenses a conductive substrate 106 from a substrate roll 108. The conductive substrate 106 is directed along a first direction (as indicated by the left-to-right arrows of FIGS. 1-4) of travel towards a receiving roller (not shown). In various embodiments, a counter-rotating roller module 110 includes a counter-rotating roller 112 stationarily positioned at a predetermined height 114 over the conductive substrate 106. The conductive substrate 106, in various embodiments, is a conductive electrode substrate including graphene-coated substrates, graphite-coated substrates, carbon-coated substrates, metal foils (including copper and aluminum), conductive polymers, conductive polymer coated metal foils, carbon fiber mats, nickel foam, Polyethylene Terephthalate (PET) coated with conductive layers, stainless steel mesh, titanium foils, and the like. The counter-rotating roller 112 does not directly contact the conductive substrate 106. According to some embodiments, the height 114 between the conductive substrate 106 and the counter-rotating roller 112 is set at a fixed height in the range from about 10 microns to 2 millimeters.

A continuous powder application module 116 is positioned on a feed side 118 of the counter-rotating roller module 110 to continuously deposit a volume 122 (e.g., a heap or charge of powder) of a dry powder mixture 124 on the conductive substrate 106 prior to contact with the counter-rotating roller 112. In various embodiment, a heap or charge of the dry powder mixture 124 is deposited by the continuous powder application module 116 in front of the counter-rotating roller 112 (e.g., on the feed side 118 prior to particles of the dry powder mixture 124 coming into contact with the counter-rotating roller 112 due to the conductive substrate 106 traveling along the first direction).

The dry powder mixture 124 includes a mixture of intermediate dry particles, with each intermediate dry particle being a composite particle that has an engineered structure that has all the requisite constituents to make an electrode. A fully functioning battery electrode is fabricated by depositing this dry particle on a current collector (e.g., conductive substrate 106) and applying a combination of heat and/or pressure to bind the intermediate dry particles to the current collector. For the purposes of this disclosure, an intermediate dry particle refers to a particle having all the required constituents in correct proportions as in an equivalent slurry without the solvent. Specifically, in the case where the electrode is a cathode, the intermediate dry particle has the binder and a conductive additive coated and mixed with the active electrode material. In some embodiments, the intermediate dry particle is a composite powder. In other embodiments, the intermediate dry particle may not be a composite powder.

In some embodiments, the dry powder mixture 124 includes a flow agent mixed in with the intermediate dry particles to alter the inter-particle interactions that influence the spreading on the conductive substrate 106. The particle size distribution of the intermediate dry particles in the dry powder mixture 124 is controlled to control the deposition and spreading on the conductive substrate 106. In various embodiments, the conductive substrate 106 is a metal foil that is primed or pre-coated with carbon or other agent to improve bonding or performance of the electrode. For example, in one embodiment, the conductive substrate 106 is a corona treated foil that improves adhesion to the dry powder mixture 124. In another embodiment, the conductive substrate 106 is a plasma-treated foil that improve adhesion to the dry powder mixture 124.

In various embodiments, the counter-rotating roller 112 rotates in a direction opposite to the travel direction of the conductive substrate 106. For example, with reference to FIG. 4, a tangential velocity direction 132 of the counter-rotating roller 112 at an interface (e.g., point of least distance) between the counter-rotating roller 112 and the conductive substrate 106 is 180 degrees opposite the first direction of travel of the conductive substrate 106. This interface between a roller and the substrate is sometimes referred to as the nip where there is direct contact between the roller and the substrate but is referred to as the interface to clarify that there is a gap (e.g., of height 114) underneath which the dry powder mixture 124 passes. In this manner, the counter-rotating roller 112 which is positioned at a fixed height 114 over the conductive substrate 106 spreads the heap or charge of the dry powder mixture 124 and to form a thin film layer of the dry powder mixture 124 to the conductive substrate 106. The counter-rotation movement of the counter-rotating roller 112 helps to distribute compaction force evenly and avoids creating hollows or ridges in the material being compacted (e.g., the dry powder mixture 124) by evenly distributing force and preventing skewing or uneven compaction.

Figure 1:
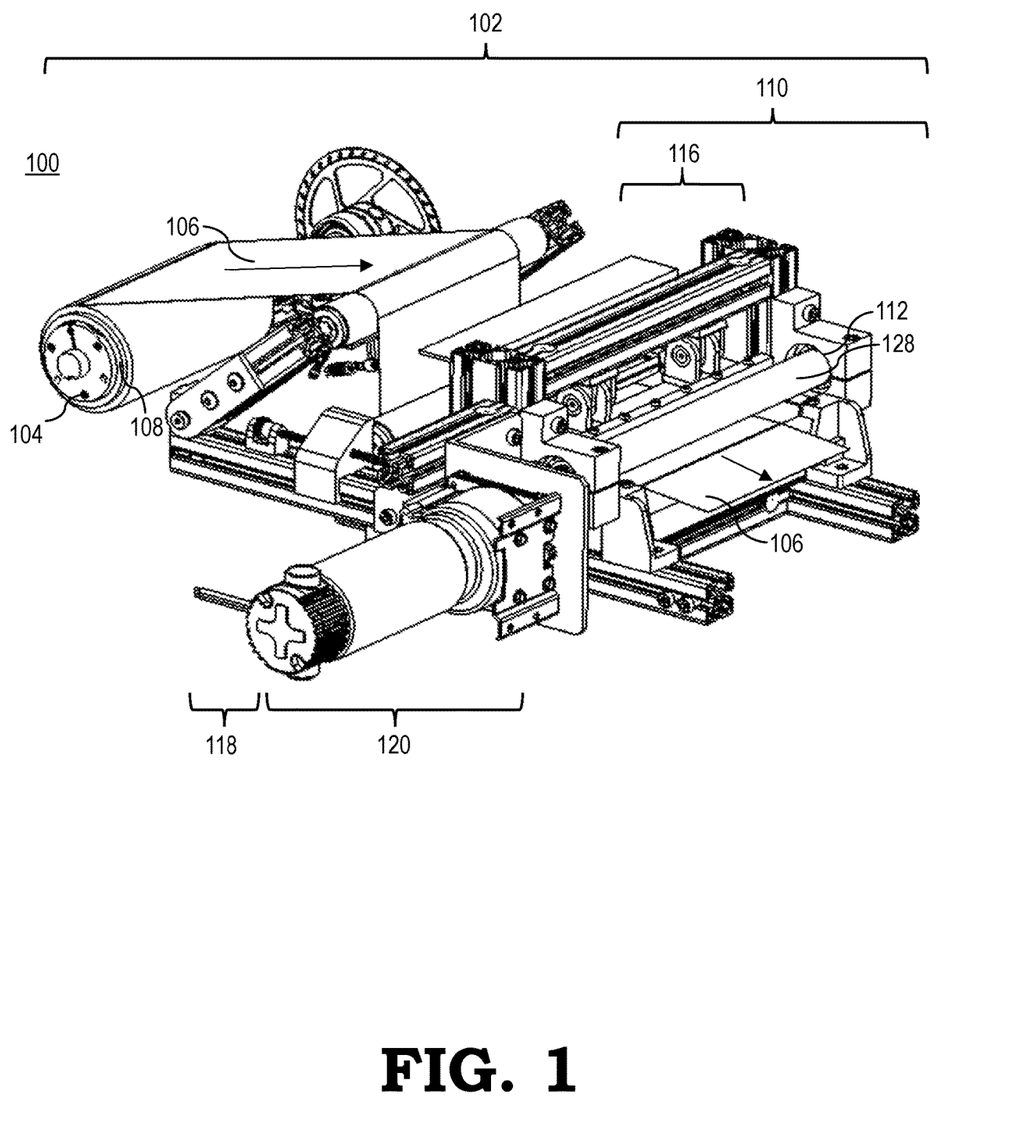
FIG. 1 is a perspective view of a counter-rotating roller system in accordance with some embodiments.
Figure 2:
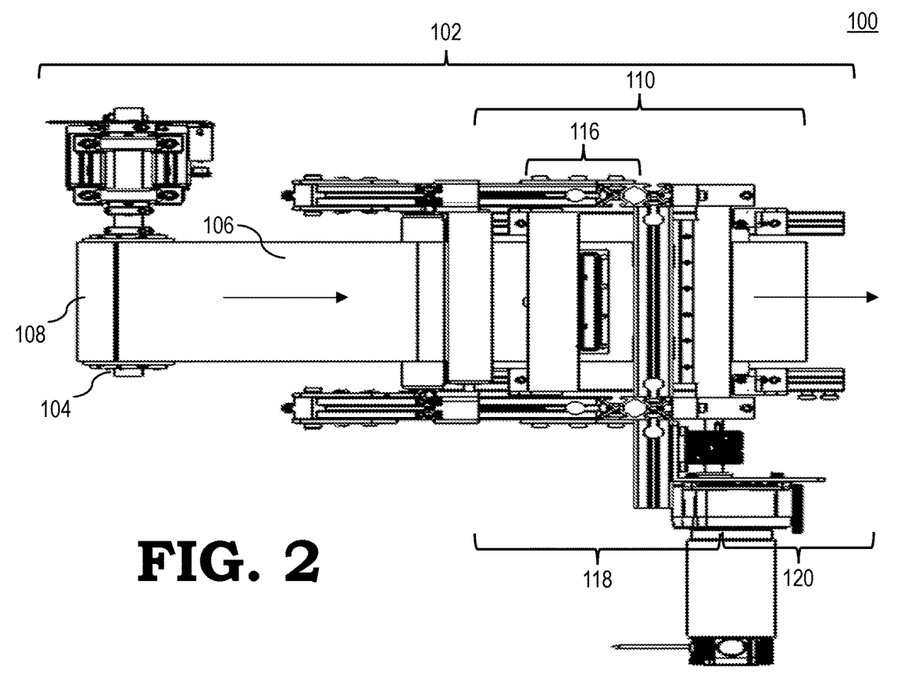
FIG. 2 is a top-down view of a counter-rotating roller system in accordance with some embodiments.
Figure 3:
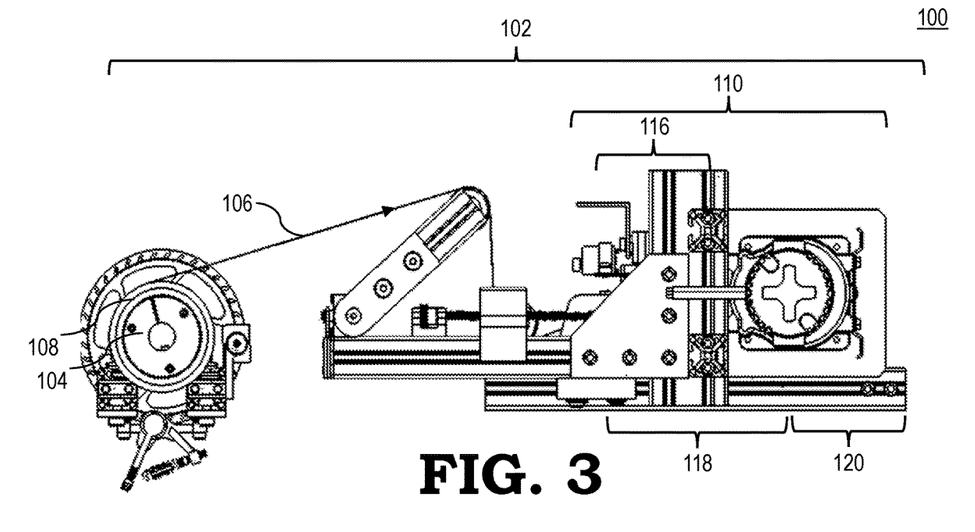
FIG. 3 is a side view of a counter-rotating roller system in accordance with some embodiments.
Figure 4:
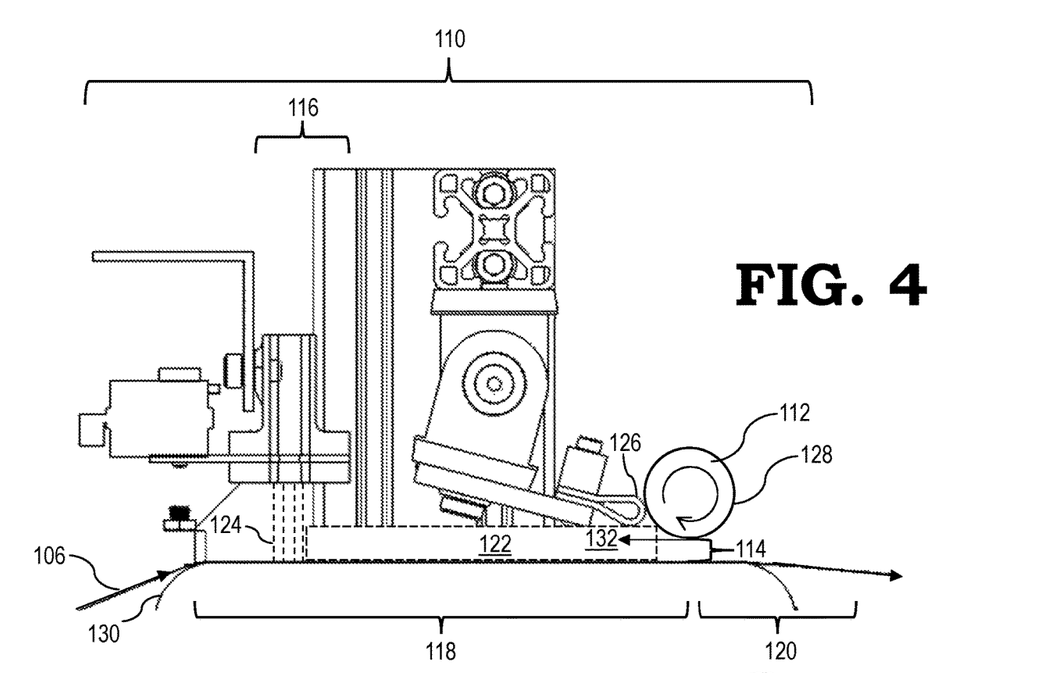
FIG. 4 is a side cross section view of a counter-rotating roller module in accordance with some embodiments.

In some embodiments, the counter-rotating roller module 110 includes flexible wipers or scrapers to prevent the dry powder mixture 124 from going on the other side. For example, as shown in FIG. 4, the counter-rotating roller module 110 includes a contact roller scraper 126 contacting the counter-rotating roller 112 that is configured to remove any residual powder particles from an outer surface 128 of the counter-rotating roller 112. The contact roller scraper 126, in various embodiments, is a flexible member (e.g., constructed out of rubber) that extends along approximately the entirety of the longitudinal length of the counter-rotating roller 112 and is in direct contact with the outer surface of the counter-rotating roller 112 such that any residual powder particles are scraped off the outer surface 128 and fall back to the feed side 118 of the counter-rotating roller module 110. That is, the contact roller scraper prevents powder particles of the dry powder mixture 124 from being carried by rotational movement over the top of the counter-rotating roller and falling to the post-roller side 120 of the counter-rotating roller module 110 as uneven loose powder (as opposed to properly passing underneath the counter-rotating roller 112 and emerging on the post-roller side 120 as a uniform film layer).

The counter-rotating roller system 100 also includes an orientation maintenance module 130 designed to maintain the conductive substrate 106 in a flat orientation beneath the counter-rotating roller module 110. In some embodiments, the orientation maintenance module 130 is a high-precision support plate or a vacuum table system that the conductive substrate 106 remains uniformly flat and does not skew off track during powder deposition and compaction processes, thereby achieving consistent layer thickness and adherence across the substrate surface. In other embodiments, the orientation maintenance module 130 is a freely rotating roller or other mechanism capable of maintaining a flat and square orientation of the conductive substrate 106 relative to the counter-rotating module 110 and counter-rotating roller 112.

It should be noted that the systems and methods of coating electrode materials to substrates using a counter-rotating roller system 100 can be performed with or without the application of heat. For example, in some embodiments, the counter-rotating roller system 100 includes a powder heating module (not shown) configured to heat the heap of dry powder mixture 124 and/or heat the conductive substrate 106 prior to contact with the counter-rotating roller 112 for improved spreading characteristics. In some embodiments, prior to engagement with the counter-rotating roller module 110, or a first section of the counter rotating module 110, the dry powder mixture 124 undergoes pre-heating using a dedicated heating unit employing established powder heating techniques to bring the powder to an optimal temperature that enhances the powder's readiness for compaction and adherence to the electrode conductive substrate 106 upon contact with the counter-rotating roller 112. For example, in some embodiments, the powder heating module includes but is not limited to: quartz lamps, infrared heaters, lasers (e.g., CO2 laser, diode laser, ND-Yag laser), heated gaseous fluids, microwave radiation heater, and the like. In various embodiments, the dry powder mixture 124 is heated prior to contacting the counter-rotating roller 112 to temperatures ranging between 20° C. to 200° C.

Similarly, in various embodiments, the surface temperature of the counter-rotating roller 112 is controlled. The counter-rotating roller 112 is heated either directly or indirectly to control flowability of the dry powder mixture 124 while spreading and coating. For example, in some embodiments, the counter-rotating roller module 110 includes an integrated heating system configured to control a temperature of the outer surface 126 of the counter-rotating roller 112. The integrated heating system enables precise temperature adjustments across the roller surface to control the thermal conditions of the powder mixture deposited on the conductive electrode substrate, and is designed to apply a specific range of pressures to the powder-coated substrate, aiding in achieving a uniformly compacted layer. Heat is applied to the counter-rotating roller system 100 using heated counter-rotating rollers or other heated rollers that aid in the conveying and/or tamping of the dry powder mixture 124 on the conductive substrate 106. In various embodiments, the rollers are heated with any combination of circulating oil, gas or other fluids, infra-red heating, resistive heating, and the like. In some embodiments, heat is applied to the respective areas using varying magnetic or electric field heating. Additionally, in some embodiments, a combination of two or more heat sources is applied to the rollers. In other embodiments, the counter-rotating roller 112 is cooled to control flowability of the dry powder mixture 124 while spreading and coating. In embodiments, the diameter of the counter-rotating roller 112 is varied to control flowability of the dry powder mixture 124 while spreading and coating. For example, in various embodiments, the counter-rotating roller 112 is heated to temperatures ranging between 20° C. to 200° C.

In other embodiments, heat is applied to the conductive substrate 106 before the application of the dry powder mixture 124. In other embodiments, heat is applied to the conductive substrate 106 after it has been coated with the dry powder mixture 124. In other embodiments, the dry powder mixture 124 is heated before application to the conductive substrate. In other embodiments, the dry powder mixture 124 is heated after application to the conductive substrate. In some other embodiments, the dry powder mixture 124 is heated and then applied to a conductive substrate 106 that is also heated.

In some embodiments, the surface finish of the outer surface 128 of the counter-rotating roller 112 is selected to adjust the coefficient of friction between the dry powder mixture 124 and the counter-rotating roller 112. The material composition and surface roughness 128 of the counter-rotating roller 112 are selected to modulate frictional interactions between the dry powder mixture 124, conductive substrate 106, and the counter-rotating roller 112, ensuring optimal compaction and layer consistency to achieve desired electrode layer properties. The surface finish of the outer surface 128 of the counter-rotating roller 112 is also selected to adjust the coefficient of friction between the conductive substrate 106 and the counter-rotating roller 112. For example, in some embodiments, the surface finish of the counter rotating roller is in a range of having average surface roughness (Ra) values are between 0.1 micron Ra (smooth) to 50 micron Ra measured according to the ISO 21920 standard. The choice of material of the counter-rotating roller 112 is varied to control flowability of the dry powder mixture 124 while spreading and coating. Additionally, in some embodiments, the counter-rotating roller 112 is electrically grounded to prevent static charge formation.

In some embodiments, the counter-rotating roller system 100 further includes a doctor blade (not shown) to assist in the spreading of the dry powder mixture 124. The dry powder mixture 124 is heaped or spread on the uncoated side of the foil, and then the height of the doctor blade is adjusted to a sufficient height to apply a uniform coat of dry powder mixture 124 particles on the conductive substrate 106. In some embodiments, the fixed surfaces of the doctor blade rides on the conductive substrate 106. In other embodiments, the fixed surfaces of the doctor blade rides above the conductive substrate 106 and not touch the conductive substrate 106 in any way. In some embodiments, the doctor blade is stationary. In other embodiments, the doctor blade moves. In some embodiments, the leading and trailing profile of the doctor blade is varied to be able to control the spreading and coating of the dry powder mixture 124. In some embodiments, the surface roughness of the leading and trailing profile of the doctor blade is varied to be able to control the spreading and coating of the dry powder mixture 124. In some embodiments, the choice of material of the doctor blade is varied to be able to control the spreading and coating of the dry powder mixture 124.

In one embodiment, the application and spreading of the dry powder mixture 124 is followed by the heating and pressing of the dry powder mixture 124 on the conductive substrate 106 (referred to as a roll-to-roll manufacturing process). In one embodiment, the dry powder mixture 124 including intermediate dry particles is spread evenly on the conductive substrate 106 and then heated and pressed after passing underneath the counter-rotating roller 112 to yield a fully functional dry battery electrode. For example, in various embodiments, the counter-rotating roller system 100 includes a post-processing compression module (not shown) positioned downstream of the counter-rotating roller module 110, wherein the post-processing compression module includes one or more heated rollers configured to exert an additional compaction force on the conductive substrate 106.

It should be recognized that FIGS. 1-5 are described above primarily in the context of presenting the conductive substrate 106 to the counter-rotating roller 112 with a roll-to-roll mechanism. However, those skilled in the art will recognize that the counter-rotating roller system 100 may present the conductive substrate 106 using various other mechanisms without departing from the scope of this disclosure. For example, in some embodiments, the conductive substrate 106 is presented to the counter-rotating roller 112 by sheet feeding, manual placement, or automated conveyor system, allowing the processing of substrates in diverse forms and sizes. In some embodiments, the conductive substrate may remain stationary with the counter-rotating roller moving relative to the conductive substrate. In some embodiments, the application, heating and pressing of the dry powder mixture 124 is performed on discrete pieces of metal foil. In some embodiments, irrespective of whether it is a roll-to-roll process or a discrete process, the dry powder mixture 124 is applied and spread and then fixed or pressed with only pressure and without the application of heat. In other embodiments, the conductive substrate 106 is fixed and the spreading mechanism (e.g., counter-rotating roller 112) moves relative to the conductive substrate 106 instead.

Figure 5:
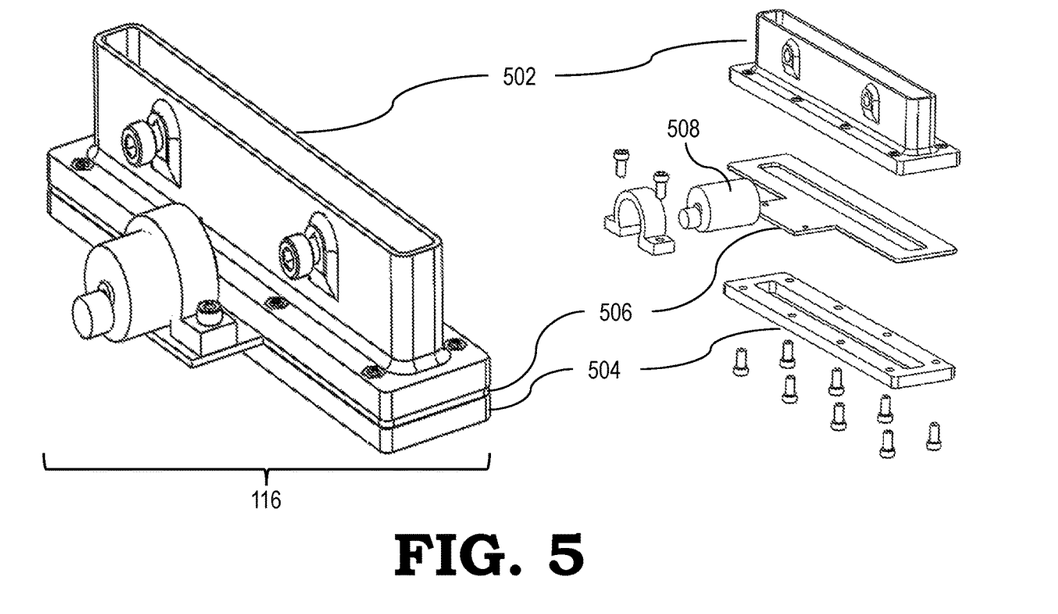
FIG. 5 is a perspective and exploded view of a continuous powder application module in accordance with some embodiments.

With reference to FIG. 5, a perspective and exploded view of a continuous powder application module 116 according to one embodiment is shown therein. The continuous powder application module 116 is configured to precisely control the volume and rate of dry powder mixture 124 dispensed onto the conductive substrate 106, utilizing real-time feedback mechanisms for uniform deposition and optimal powder utilization. As shown, the powder application module 116 includes a powder hopper 502 for retaining the dry powder mixture 124. The powder hopper 502 includes a bottom plate 504 that secures a sieve screen 506 (e.g., a mesh) to the powder hopper 502. Vibrations are applied to the powder hopper 502 by the vibrator 508, thereby causing particles of the dry powder mixture 124 to be dispersed from the bottom out through the sieve screen 506 and onto the conductive substrate 106 due to the mechanical vibrations. In some embodiments, the vibrating powder hopper 502 with a control mesh opening is used to provide feed material to the counter-rotating roller 112. According to various embodiments, the sieve screen 506 has a mesh or screen opening size in the range between US Mesh size 10 (2000 micron opening) to US Mesh size 1250 (10 micron opening). In some embodiments, the sieve screen 506 has a mesh or screen opening size in the range between US Mesh size 50 (297 micron opening) to US Mesh size 400 (37 micron opening).

In other embodiments, the vibrating powder hopper 502 provides feed material to a doctor blade. In some embodiments, the vibrating powder hopper 502 with mesh bottom is stationary. In other embodiments, the vibrating powder hopper 502 moves along one axis as the conductive substrate 106 is being coated. In yet another embodiment, the powder hopper 502 moves back and forth across the width of the conductive substrate 106. In some embodiments, the mesh or opening size of the vibrating powder hopper 502 is varied to be able to better control the spreading and coating of the dry powder mixture 124. In some embodiments of the hole size in the bottom of the vibrating hopper is not uniform. In some embodiments, the amplitude and frequency of mechanical vibration is varied to be able to control the spreading and coating of the dry powder mixture 124. In some embodiments, the width of the tank in the direction of relative movement with respect to the conductive substrate 106 is varied to be able to control the spreading and coating of the dry powder mixture 124. In other embodiments, the heap or charge of the dry powder mixture 124 is deposited or fed in front of the counter-rotating roller 112 using other apparatuses. For example, in various embodiments, the continuous powder application module 116 includes but is not limited to: a star feeder, a screw feeder, and the like.

Additionally, other apparatuses for continuously applying powder to the conductive substrate 106 include an inclined vibrating table. The surface roughness of the base of the vibrating table, the amplitude and frequency of the vibration, the height above the conductive substrate 106, temperature of the vibrating table, the addition of a gate towards the dispensing edge of the table are parameters that are controlled to get a good spreading and coating on the foil. Similarly, in other embodiments, the continuous powder application module 116 includes a dry powder spraying system such as a high volume low pressure (HVLP) spraying system or a low volume low pressure (LVLP) system in which pressured air or any other gaseous fluid aerosolizes particles of the dry powder mixture 124 and transfers the particles to the conductive substrate 106. In various embodiments, the diameter and shape of the nozzle, the volume and pressure of the gaseous fluid, the temperature of the gaseous fluid, the distance between the nozzle, and the substrate are parameters varied to achieve better spreading and coating on the conductive substrate 106. In various embodiments, different combinations of feeding methods and leveling method might be used, including but not limited to multiples of feeding and multiples of leveling methods in series.

It should be recognized that FIGS. 1-4 are described above primarily in the context of a singular counter-rotating roller 112 for ease of illustration and description. However, those skilled in the art will recognize that the counter-rotating roller system 100 may include any number of rollers without departing from the scope of this disclosure. For example, in some embodiments, the counter-rotating roller module 110 includes two or more counter-rotating rollers arranged in series at different heights above the conductive substrate 106 to incrementally increase the density (e.g., by reducing the thickness of the film layer) of the electrode substrate by sequentially applying compaction forces, thereby optimizing the powder layer's density and uniformity. Additionally, those skilled in the art will recognize that the two or more counter-rotating rollers may be positioned at different heights, rotate at different speeds, have different surface finishes/textures, and/or heated to different temperatures relative to each other.

Figure 6:
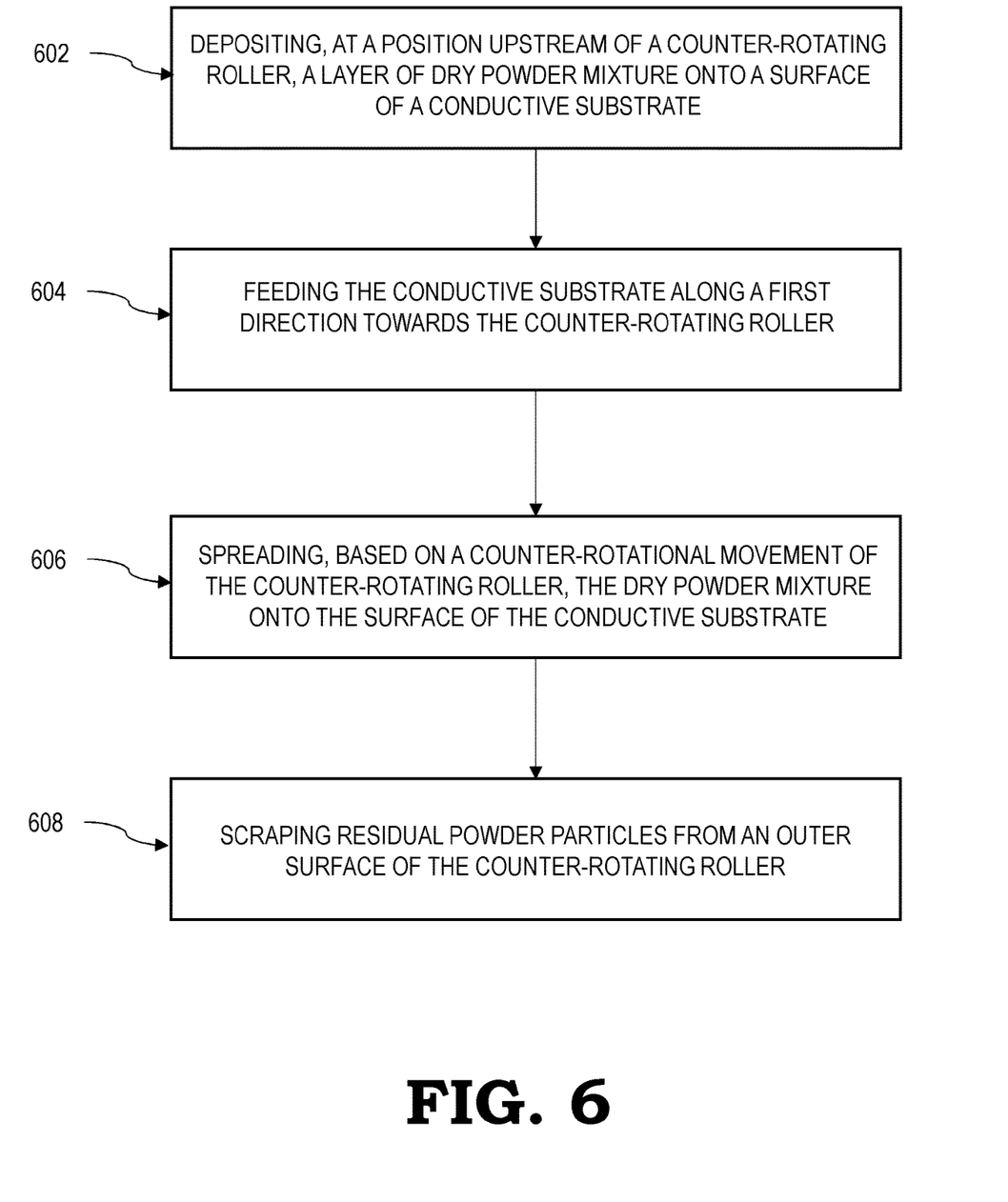
FIG. 6 is a block diagram of a method for coating electrode materials to conductive substrates in accordance with some embodiments.

Referring now to FIG. 6, illustrated is a block diagram of a method 600 for coating electrode materials to conductive substrates in accordance with some embodiments. For ease of illustration and description, the method 600 is described below with reference to and in an example context of the counter-rotating roller system of FIGS. 1-5. However, the method 600 is not limited to these example contexts, but instead may be employed for any of a variety of possible configurations using the guidelines provided herein.

The method 600 begins at block 602 with depositing, at a position upstream of a counter-rotating roller, a volume of a dry powder mixture onto a surface of a conductive substrate. In various embodiments, the operations of block 602 include continuously depositing a volume of the dry powder mixture as the conductive substrate travels along a first direction towards the counter-rotating roller. For example, in the context of FIGS. 1-5, a continuous powder application module 116 is positioned on a feed side 118 of the counter-rotating roller module 110 to continuously deposit a volume 122 of a dry powder mixture 124 on the conductive substrate 106 prior to contact with the counter-rotating roller 112. The continuous deposition of the volume of a dry powder mixture on the substrate is performed prior to its engagement with the counter-rotating roller, with the volume deposited to achieve a predetermined thickness of the powder on the conductive substrate.

In various embodiments, the operations of block 602 also include precisely controlling the volume and rate of dry powder mixture dispensed onto the substrate using real-time feedback mechanisms. For example, in some embodiments, a rate of powder deposition from the continuous powder application module 116 is closely match to a volume of powder mixture spread by and passing underneath the counter-rotating roller 112 to prevent a gradual buildup of dry powder mixture 124 on the feed side 118 of the counter-rotating roller module 110 that would eventually overwhelm the contact roller scraper 126 and/or spill off of the conductive substrate 106 and orientation maintenance module 130.

In various embodiment, the conductive substrate is primed or pre-coated with carbon or any other agent that improves bonding or performance of the electrode. In one embodiment, the foil can be corona treated to improve adhesion to the dry powder mixture 124. In another embodiment, the foil can be plasma treated to improve adhesion to the dry powder mixture 124. In various embodiments, a heap or charge of the dry powder mixture 124 is deposited by the continuous powder application module 116 in front of the counter-rotating roller 112 (e.g., on the feed side 118 prior to particles of the dry powder mixture 124 coming into contact with the counter-rotating roller 112 due to the conductive substrate 106 traveling along the first direction).

As illustrated in FIG. 5, the powder application module 116 includes a powder hopper 502 for retaining the dry powder mixture 124 and configured to precisely control the volume and rate of dry powder mixture 124 dispensed onto the conductive substrate 106, utilizing real-time feedback mechanisms for uniform deposition and optimal powder utilization. The powder hopper 502 includes a bottom plate 504 that secures a sieve screen 506 (e.g., a mesh) to the powder hopper 502. Vibrations are applied to the powder hopper 502 by the vibrator 508, thereby causing particles of the dry powder mixture 124 to be dispersed from the bottom out through the sieve screen 506 and onto the conductive substrate 106 due to the mechanical vibrations. In some embodiments, the vibrating powder hopper 502 with a control mesh opening is used to provide feed material to the counter-rotating roller 112.

In other embodiments, the vibrating powder hopper 502 provides feed material to a doctor blade. In some embodiments, the vibrating powder hopper 502 with mesh bottom is stationary. In other embodiments, the vibrating powder hopper 502 moves along one axis as the conductive substrate 106 is being coated. In yet another embodiment, the powder hopper 502 moves back and forth across the width of the conductive substrate 106. In some embodiments, the mesh or opening size of the vibrating powder hopper 502 is varied to be able to better control the spreading and coating of the dry powder mixture 124. In some embodiments of the hole size in the bottom of the vibrating hopper is not uniform. In some embodiments, the amplitude and frequency of mechanical vibration is varied to be able to control the spreading and coating of the dry powder mixture 124. In some embodiments, the width of the tank in the direction of relative movement with respect to the conductive substrate 106 is varied to be able to control the spreading and coating of the dry powder mixture 124. In other embodiments, the heap or charge of the dry powder mixture 124 is deposited or fed in front of the counter-rotating roller 112 using other apparatuses. For example, in various embodiments, the continuous powder application module 116 includes but is not limited to: a star feeder, a screw feeder, and the like.

Additionally, in other embodiments, an inclined vibrating table continuously applies powder to the conductive substrate 106. The surface roughness of the base of the vibrating table, the amplitude and frequency of the vibration, the height above the conductive substrate 106, temperature of the vibrating table, the addition of a gate towards the dispensing edge of the table are parameters that are controlled to get a good spreading and coating on the foil. Similarly, in other embodiments, the continuous powder application module 116 includes a dry powder spraying system such as a high volume low pressure (HVLP) spraying system or a low volume low pressure (LVLP) system in which pressured air or any other gaseous fluid aerosolizes particles of the dry powder mixture 124 and transfers the particles to the conductive substrate 106. In various embodiments, the diameter and shape of the nozzle, the volume and pressure of the gaseous fluid, the temperature of the gaseous fluid, the distance between the nozzle, and the substrate are parameters varied to achieve better spreading and coating on the conductive substrate 106. In various embodiments, different combinations of feeding methods and leveling method might be used, including but not limited to multiples of feeding and multiples of leveling methods in series.

In other embodiments, heat is applied to the conductive substrate 106 before the application of the dry powder mixture 124. In other embodiments, heat is applied to the conductive substrate 106 after it has been coated with the dry powder mixture 124. In other embodiments, the dry powder mixture 124 is heated before application to the conductive substrate. In other embodiments, the dry powder mixture 124 is heated after application to the conductive substrate. In some other embodiments, the dry powder mixture 124 is heated and then applied to a conductive substrate 106 that is also heated. For example, in some embodiments, the counter-rotating roller system 100 includes a powder heating module (not shown) configured to heat the heap of dry powder mixture 124 and/or heat the conductive substrate 106 prior to contact with the counter-rotating roller 112 for improved spreading characteristics. In some embodiments, prior to engagement with the counter-rotating roller module 110, or a first section of the counter rotating module 110, the dry powder mixture 124 undergoes pre-heating using a dedicated heating unit employing established powder heating techniques to bring the powder to an optimal temperature that enhances the powder's readiness for compaction and adherence to the electrode conductive substrate 106 upon contact with the counter-rotating roller 112. For example, in some embodiments, the powder heating module includes but is not limited to: quartz lamps, infrared heaters, lasers (e.g., CO2 laser, diode laser, ND-Yag laser), heated gaseous fluids, microwave radiation heater, and the like. In various embodiments, the dry powder mixture 124 is heated prior to contacting the counter-rotating roller 112 to temperatures ranging between 20° C. to 200° C.

The method 600 continues at block 604 with feeding the conductive substrate along a first direction towards the counter-rotating roller. With respect to FIGS. 1-4, in various embodiments, the counter-rotate roller system 100 includes a roll-to-roll apparatus 102 including a dispensing roller 104 that selectively dispenses a conductive substrate 106 from a substrate roll 108. The conductive substrate 106 is directed along a first direction (as indicated by the left-to-right arrows of FIGS. 1-4) of travel towards a receiving roller (not shown). In some embodiments, the operations of block 604 further include adjusting the unwinding operation of the conductive substrate from the substrate roll 108 with both continuous and intermittent feed at variable speeds.

In various embodiments, the operations of block 604 also include maintaining the conductive substrate in a flat orientation beneath the counter-rotating roller. For example, with reference to FIG. 4, in various embodiments, the counter-rotating roller system 100 also includes an orientation maintenance module 130 designed to maintain the conductive substrate 106 in a flat orientation beneath the counter-rotating roller module 110. In some embodiments, the orientation maintenance module 130 is a high-precision support plate or a vacuum table system that the conductive substrate 106 remains uniformly flat and does not skew off track during powder deposition and compaction processes, thereby achieving consistent layer thickness and adherence across the substrate surface. In other embodiments, the orientation maintenance module 130 is a freely rotating roller or other mechanism capable of maintaining a flat and square orientation of the conductive substrate 106 relative to the counter-rotating module 110 and counter-rotating roller 112.

In other embodiments, rather than utilizing a roll-to-roll mechanism, feeding the conductive substrate to the counter-rotating roller includes sheet feeding, manual placement, or automated conveyor system, allowing the processing of substrates in diverse forms and sizes. In some embodiments, the conductive substrate may remain stationary with the counter-rotating roller moving relative to the conductive substrate. In some embodiments, the application, heating and pressing of the dry powder mixture 124 is performed on discrete pieces of metal foil.

The method 600 continues at block 606 with spreading, based at least in part on a counter-rotational movement of the counter-rotating roller, the volume of the dry powder mixture onto the surface of the conductive substrate, wherein a direction of the tangential velocity of the counter-rotating roller at an interface between the counter-rotating roller and the conductive substrate is 180 degrees opposite the first direction of travel of the conductive substrate. With respect to FIG. 4, in various embodiments, a counter-rotating roller module 110 includes a counter-rotating roller 112 stationarily positioned at a predetermined height 114 over the conductive substrate 106.

The counter-rotating roller 112 rotates in a direction opposite to the travel direction of the conductive substrate 106 to form a constant layer thickness and density of powder across the conductive substrate. For example, with reference to FIG. 4, a tangential velocity direction 132 of the counter-rotating roller 112 at an interface (e.g., point of least distance) between the counter-rotating roller 112 and the conductive substrate 106 is 180 degrees opposite the first direction of travel of the conductive substrate 106. This interface between a roller and the substrate is sometimes referred to as the nip where there is direct contact between the roller and the substrate but is referred to as the interface to clarify that there is a gap (e.g., of height 114) underneath which the dry powder mixture 124 passes. In this manner, the counter-rotating roller 112 which is positioned at a fixed height 114 over the conductive substrate 106 spreads the heap or charge of the dry powder mixture 124 and to form a thin film layer of the dry powder mixture 124 to the conductive substrate 106. The counter-rotation movement of the counter-rotating roller 112 helps to distribute compaction force evenly and avoids creating hollows or ridges in the material being compacted (e.g., the dry powder mixture 124) by evenly distributing force and preventing skewing or uneven compaction. Further, counter rotation speed of the counter-rotating roller 112 is adjustable to be able to control the spreading and coating of the dry powder mixture 124.

It should be noted that operations of block 606 for coating electrode materials to substrates using counter-rotational movement can be performed with or without the application of heat. For example, in some embodiments, the surface temperature of the counter-rotating roller 112 is controlled. The counter-rotating roller 112 is heated either directly or indirectly to control flowability of the dry powder mixture 124 while spreading and coating. For example, in some embodiments, the counter-rotating roller module 110 includes an integrated heating system configured to control a temperature of the outer surface 126 of the counter-rotating roller 112. The integrated heating system enables precise temperature adjustments across the roller surface to control the thermal conditions of the powder mixture deposited on the conductive electrode substrate, and is designed to apply a specific range of pressures to the powder-coated substrate, aiding in achieving a uniformly compacted layer. Heat is applied to the counter-rotating roller system 100 using heated counter-rotating rollers or other heated rollers that aid in the conveying and/or tamping of the dry powder mixture 124 on the conductive substrate 106. In various embodiments, the rollers are heated with any combination of circulating oil, gas or other fluids, infra-red heating, resistive heating, and the like. In some embodiments, heat is applied to the respective areas using varying magnetic or electric field heating. Additionally, in some embodiments, a combination of two or more heat sources is applied to the rollers. In other embodiments, the counter-rotating roller 112 is cooled to control flowability of the dry powder mixture 124 while spreading and coating. In some embodiments, the diameter of the counter-rotating roller 112 is varied to control flowability of the dry powder mixture 124 while spreading and coating. For example, in various embodiments, the counter-rotating roller 112 is heated to temperatures ranging between 20° C. to 200° C.

In other embodiments, the counter-rotating roller system 100 further includes a doctor blade (not shown) to assist in the spreading of the dry powder mixture 124. The dry powder mixture 124 is heaped or spread on the uncoated side of the foil, and then the height of the doctor blade is adjusted to a sufficient height to apply a uniform coat of dry powder mixture 124 particles on the conductive substrate 106. In some embodiments, the fixed surfaces of the doctor blade rides on the conductive substrate 106. In other embodiments, the fixed surfaces of the doctor blade rides above the conductive substrate 106 and not touch the conductive substrate 106 in any way. In some embodiments, the doctor blade is stationary. In other embodiments, the doctor blade moves. In some embodiments, the leading and trailing profile of the doctor blade is varied to be able to control the spreading and coating of the dry powder mixture 124. In some embodiments, the surface roughness of the leading and trailing profile of the doctor blade is varied to be able to control the spreading and coating of the dry powder mixture 124. In some embodiments, the choice of material of the doctor blade is varied to be able to control the spreading and coating of the dry powder mixture 124.

The method 600 continues at block 608 with scraping, based on a contact roller scraper contacting the counter-rotating roller, residual powder particles from an outer surface of the counter-rotating roller. With respect to FIG. 4, in various embodiments, the counter-rotating roller module 110 includes flexible wipers or scrapers to prevent the dry powder mixture 124 from going on the other side. For example, as shown in FIG. 4, the counter-rotating roller module 110 includes a contact roller scraper 126 contacting the counter-rotating roller 112 that is configured to remove any residual powder particles from an outer surface 128 of the counter-rotating roller 112. The contact roller scraper 126, in various embodiments, is a flexible member (e.g., constructed out of rubber) that extends along approximately the entirety of the longitudinal length of the counter-rotating roller 112 and is in direct contact with the outer surface of the counter-rotating roller 112 such that any residual powder particles are scraped off the outer surface 128 and fall back to the feed side 118 of the counter-rotating roller module 110. That is, the contact roller scraper prevents powder particles of the dry powder mixture 124 from being carried by rotational movement over the top of the counter-rotating roller and falling to the post-roller side 120 of the counter-rotating roller module 110 as uneven loose powder (as opposed to properly passing underneath the counter-rotating roller 112 and emerging on the post-roller side 120 as a uniform film layer).

In some embodiments, the operations of block 608 are followed by the heating and/or pressing of the dry powder mixture 124 on the conductive substrate 106 (referred to as a roll-to-roll manufacturing process), thereby compacting the powder-coated substrate to form an electrode layer. In one embodiment, the dry powder mixture 124 including intermediate dry particles is spread evenly on the conductive substrate 106 and then heated and pressed after passing underneath the counter-rotating roller 112 to yield a fully functional dry battery electrode. For example, in various embodiments, the counter-rotating roller system 100 includes a post-processing compression module (not shown) positioned downstream of the counter-rotating roller module 110, wherein the post-processing compression module includes one or more heated rollers configured to exert an additional compaction force on the conductive substrate 106. In some embodiments, irrespective of whether it is a roll-to-roll process or a discrete process, the dry powder mixture 124 is applied and spread and then fixed or pressed with only pressure and without the application of heat.

It should be recognized that FIGS. 1-6 are described above primarily in the context of a singular counter-rotating roller 112 for ease of illustration and description. However, those skilled in the art will recognize that the counter-rotating roller system 100 may include any number of rollers without departing from the scope of this disclosure. In some embodiments, post-processing compression pressure is applied using two rollers similar to the traditional rolling mill after the conductive substrate is coated with the dry powder mixture 124. The diameter of the rollers, the surface finish and roughness of the rollers, material choice of the rollers, speed of the rollers, any coatings on the rollers (nitriding, anti-slip, non-stick, anti-corrosion), temperature of the rollers, and the gap between the rollers are important to control to get the appropriate final electrode thickness.

For example, in some embodiments, the counter-rotating roller module 110 includes two or more counter-rotating rollers arranged in series at different heights above the conductive substrate 106 to incrementally increase the density (e.g., by reducing the thickness of the film layer) of the electrode substrate by sequentially applying compaction forces, thereby optimizing the powder layer's density and uniformity, sometime referred to as laminating. Additionally, those skilled in the art will recognize that the two or more counter-rotating rollers may be positioned at different heights, rotate at different speeds, have different surface finishes/textures, and/or heated to different temperatures relative to each other.

In some embodiments, there are successive pairs of rollers that successively compress the foil with the coated dry powder mixture 124. This is achieved by having decreasing spacing between the two rollers in each successive roller pair. In some embodiments, there is only one roller and instead of the other roller it can be a fixed object/plate/table/curved surface where the foil slides over. In some embodiments, the angle of wrap is varied between the foil and roller for improved binding of the dry powder mixture 124 to the conductive substrate 106. In some embodiments, the roller is completely replaced by an inclined upper belt and a flat lower belt where the gap successively decreases along the length of the belts. The belt can be constructed with a variety of materials and the foil coated with the dry powder mixture 124 will move through the belt. In another embodiment, the upper belt and lower belt are both inclined. These belts could be heated or not heated.

Accordingly, as discussed herein, FIGS. 1-6 describe techniques that improve electrode manufacturing for use in electrochemical energy storage devices such as batteries and more specifically lithium-ion based batteries by helping to reduce capital and operating costs, energy usage and eliminate or minimize the use of toxic and environmentally hazardous materials. This disclosure can be applied to both the anode electrode manufacturing and cathode electrode manufacturing of the secondary ionic battery such as a lithium-ion battery, a sodium-ion battery, and the like.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    feeding, at a position upstream of a counter-rotating roller, a conductive substrate in an upwardly inclined direction towards a first curved edge of a stationary orientation maintenance module;
    transitioning, after passing the first curved edge, to feeding the conductive substrate over a horizontal surface of the stationary orientation maintenance module along a first direction and towards the counter-rotating roller;
    depositing a volume of a dry powder mixture onto a surface of the conductive substrate;
    spreading, based at least in part on a counter-rotational movement of the counter-rotating roller, the volume of the dry powder mixture onto the surface of the conductive substrate, wherein a tangential velocity direction of the counter-rotating roller at an interface between the counter-rotating roller and the conductive substrate is 180 degrees opposite the first direction of travel of the conductive substrate;
    scraping, based on a contact roller scraper contacting the counter-rotating roller, residual powder particles from an outer surface of the counter-rotating roller; and
    feeding, at a position downstream of the counter-rotating roller, the conductive substrate in a downwardly declined direction away from a second curved edge of the stationary orientation maintenance module to maintain the conductive substrate in a flat orientation on the horizontal surface of the stationary orientation maintenance module.

2. The method of claim 1, further comprising: dispensing the conductive substrate from a substrate roll of a roll-to-roll apparatus.

3. The method of claim 1, wherein depositing the volume of the dry powder mixture further comprises continuously depositing the volume of the dry powder mixture as the conductive substrate travels along the first direction towards the counter-rotating roller.

4. The method of claim 1, further comprising: pre-heating the dry powder mixture prior to engagement with the counter-rotating roller.

5. The method of claim 4, wherein pre-heating the dry powder mixture comprises heating the dry powder mixture to a temperature ranging between 20° C. to 200° C.

6. The method of claim 1, further comprising: heating the outer surface of the counter-rotating roller to a temperature ranging between 20° C. to 200° C.

* * * * *